(12) United States Patent
Sundaram et al.

(10) Patent No.: US 12,412,152 B2  
(45) Date of Patent: *Sep. 9, 2025

(54) SECURING LENDER OUTPUT DATA

(71) Applicant: Capital One Services, LLC, McLean, VA (US)

(72) Inventors: Dinesh Sundaram, Plano, TX (US); Trent Jones, Mckinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,839

(22) Filed: Oct. 17, 2023

(65) Prior Publication Data

US 2024/0046212 A1 Feb. 8, 2024

Related U.S. Application Data

(63) Continuation of application No. 17/196,738, filed on Mar. 9, 2021, now Pat. No. 11,797,932, which is a
(Continued)

(51) Int. Cl.  
G06F 21/00 (2013.01)  
G06F 9/445 (2018.01)  
(Continued)

(52) U.S. Cl.  
CPC ......... *G06Q 10/10* (2013.01); *G06F 9/44505* (2013.01); *G06F 9/54* (2013.01);
(Continued)

(58) Field of Classification Search  
CPC .... G06Q 30/0643; G06Q 40/02; G06Q 40/03; G06Q 50/265; G06Q 2220/00;
(Continued)

(56) References Cited

U.S. PATENT DOCUMENTS 6,029,149 A * 2/2000 Dykstra ................. G06Q 40/03  
705/38  
6,208,979 B1 * 3/2001 Sinclair ................. G06Q 30/02  
705/38

(Continued)

FOREIGN PATENT DOCUMENTS

EP 3723341 A1 10/2020  
WO 2015136503 A1 9/2015

OTHER PUBLICATIONS

NPL Search History (Year: 2024).*  
NPL Search (Google Scholar) (Year: 2020).  
Bluttman, Ken, Using the Excel IF Function: Testing on One Condition, published Mar. 22, 2019 (available at https://www.dummies.com/article/technology/software/microsoft-products/excel/using-the-excel-if-function-testing-on-one-condition-259894/) (Year: 2019).

(Continued)

*Primary Examiner* — Mahfuzur Rahman  
(74) *Attorney, Agent, or Firm* — Sterne, Kessler, Goldstein & Fox P.L.L.C.

(57) ABSTRACT

A multi-lender architecture is configured to provide a loan applicant with automated pre-qualification and automobile loan eligibility evaluation for multiple candidate lenders. Lender output data may include sensitive data. The lender output data is stored in a data object of a first format and one or more fields of the data object are encrypted at the field level. The encrypted data object may be transmitted through multiple application layers or terminals. The encrypted data object may be reformatted at one or more application layers or terminals without decryption. A reformatted encrypted data object containing the lender output data may be decrypted at the last layer before forwarding the lender output data to the loan applicant.

20 Claims, 6 Drawing Sheets

Related U.S. Application Data continuation of application No. 16/882,274, filed on May 22, 2020, now Pat. No. 10,990,993.

(60) Provisional application No. 62/852,202, filed on May 23, 2019.

(51) Int. Cl.

| | | |
|---|---|---|
| *G06F 9/54* | (2006.01) | |
| *G06F 16/25* | (2019.01) | |
| *G06F 16/955* | (2019.01) | |
| *G06F 18/24* | (2023.01) | |
| *G06F 21/53* | (2013.01) | |
| *G06F 21/60* | (2013.01) | |
| *G06F 21/62* | (2013.01) | |
| *G06F 40/103* | (2020.01) | |
| *G06F 40/174* | (2020.01) | |
| *G06F 40/18* | (2020.01) | |
| *G06N 3/02* | (2006.01) | |
| *G06N 5/025* | (2023.01) | |
| *G06N 20/00* | (2019.01) | |
| *G06Q 10/10* | (2023.01) | |
| *G06Q 20/38* | (2012.01) | |
| *G06Q 20/40* | (2012.01) | |
| *G06Q 30/018* | (2023.01) | |
| *G06Q 30/0201* | (2023.01) | |
| *G06Q 30/0601* | (2023.01) | |
| *G06Q 40/02* | (2023.01) | |
| *G06Q 40/03* | (2023.01) | |
| *H04L 9/08* | (2006.01) | |
| *H04L 9/40* | (2022.01) | |
| *H04L 67/01* | (2022.01) | |
| *G06F 8/65* | (2018.01) | |
| *G06F 8/71* | (2018.01) | |
| *G06K 7/14* | (2006.01) | |
| *G06Q 50/26* | (2012.01) | |

(52) U.S. Cl.
CPC ............ *G06F 9/547* (2013.01); *G06F 16/258* (2019.01); *G06F 16/9558* (2019.01); *G06F 16/9562* (2019.01); *G06F 18/24* (2023.01); *G06F 21/53* (2013.01); *G06F 21/602* (2013.01); *G06F 21/604* (2013.01); *G06F 21/6227* (2013.01); *G06F 21/6245* (2013.01); *G06F 40/103* (2020.01); *G06F 40/174* (2020.01); *G06F 40/18* (2020.01); *G06N 3/02* (2013.01); *G06N 5/025* (2013.01); *G06N 20/00* (2019.01); *G06Q 20/382* (2013.01); *G06Q 20/4014* (2013.01); *G06Q 30/0185* (2013.01); *G06Q 30/0206* (2013.01); *G06Q 30/0601* (2013.01); *G06Q 30/0613* (2013.01); *G06Q 30/0619* (2013.01); *G06Q 30/0637* (2013.01); *G06Q 30/0643* (2013.01); *G06Q 40/02* (2013.01); *G06Q 40/03* (2023.01); *H04L 9/0825* (2013.01); *H04L 63/0435* (2013.01); *H04L 63/08* (2013.01); *H04L 63/0815* (2013.01); *H04L 63/102* (2013.01); *H04L 63/123* (2013.01); *H04L 63/166* (2013.01); *H04L 63/168* (2013.01); *H04L 67/01* (2022.05); *G06F 8/65* (2013.01); *G06F 8/71* (2013.01); *G06F 2221/2107* (2013.01); *G06K 7/1417* (2013.01); *G06Q 50/265* (2013.01); *G06Q 2220/00* (2013.01); *H04L 9/0822* (2013.01)

(58) Field of Classification Search
CPC ... H04L 9/0825; H04L 63/0435; H04L 63/08; H04L 63/0815; H04L 63/102; H04L 63/123; H04L 63/166; H04L 63/168; H04L 67/01; H04L 9/0822; H04L 63/0442; H04L 63/0471; H04L 9/0894; H04L 63/0428; H04L 63/0478; G06F 8/65; G06F 8/71; G06F 2221/2107; G06F 21/606; G06F 21/6209; G06K 7/1417; G06N 3/048; G06N 5/01; G06N 20/10; G06N 3/084; G06N 5/047

See application file for complete search history.

(56) References Cited

U.S. PATENT DOCUMENTS

| | | | |
|---|---|---|---|
| 7,107,241 B1* | 9/2006 | Pinto | G06Q 40/03 705/38 |
| 7,860,767 B1* | 12/2010 | Vinci | G06Q 40/06 705/35 |
| 8,099,605 B1* | 1/2012 | Billsrom | H04L 69/40 726/28 |
| 8,666,885 B1* | 3/2014 | Bramlage | G06Q 40/03 705/38 |
| 8,924,720 B2* | 12/2014 | Raghuram | H04L 63/062 713/150 |
| 9,137,228 B1 | 9/2015 | Newstadt | |
| 9,646,172 B1* | 5/2017 | Hahn | G06F 21/602 |
| 9,762,616 B2* | 9/2017 | Nagaratnam | H04L 63/0254 |
| 9,965,911 B2* | 5/2018 | Wishne | G07C 9/00904 |
| 10,033,702 B2* | 7/2018 | Ford | G06F 21/64 |
| 10,171,457 B2 | 1/2019 | Moore et al. | |
| 10,243,945 B1 | 3/2019 | Kruse et al. | |
| 11,797,932 B2 | 10/2023 | Sundaram et al. | |
| 2002/0023051 A1* | 2/2002 | Kunzle | G06Q 30/02 705/38 |
| 2002/0033838 A1 | 3/2002 | Krueger et al. | |
| 2002/0040339 A1* | 4/2002 | Dhar | G06Q 10/10 705/38 |
| 2002/0091629 A1* | 7/2002 | Danpour | G06Q 40/00 705/38 |
| 2003/0036993 A1* | 2/2003 | Parthasarathy | G06Q 40/03 705/38 |
| 2005/0086176 A1 | 4/2005 | Dahlgren et al. | |
| 2005/0203834 A1* | 9/2005 | Prieston | G06Q 40/06 705/38 |
| 2006/0178983 A1* | 8/2006 | Nice | G06Q 40/02 705/38 |
| 2007/0061248 A1* | 3/2007 | Shavit | G06Q 40/04 705/37 |
| 2007/0250718 A1* | 10/2007 | Lee | H04L 63/0861 713/186 |
| 2008/0092240 A1* | 4/2008 | Sitrick | H04L 9/0866 726/27 |
| 2009/0327196 A1* | 12/2009 | Studer | G06F 8/00 707/999.1 |
| 2012/0017008 A1 | 1/2012 | Carter et al. | |
| 2012/0246061 A1* | 9/2012 | Ericksen | G06Q 40/03 705/38 |
| 2012/0254957 A1 | 10/2012 | Fork et al. | |
| 2013/0191629 A1* | 7/2013 | Treinen | H04L 9/0833 713/153 |
| 2014/0006048 A1* | 1/2014 | Liberty | G06Q 30/0241 705/2 |
| 2014/0189123 A1 | 7/2014 | Dodd et al. | |
| 2014/0207571 A1* | 7/2014 | Hammock | G06Q 30/0255 705/14.53 |
| 2014/0237236 A1 | 8/2014 | Kalinichenko et al. | |
| 2014/0304170 A1* | 10/2014 | Spotanski | G06Q 20/354 705/64 |
| 2015/0026038 A1* | 1/2015 | Alsbrooks | G06Q 40/03 705/38 |
| 2015/0074407 A1 | 3/2015 | Palmeri et al. | |
| 2015/0161364 A1* | 6/2015 | Makarov | G06F 21/6218 726/4 |

(56) References Cited

U.S. PATENT DOCUMENTS

| | | | | |
|---|---|---|---|---|
| 2015/0347770 | A1* | 12/2015 | Whalley | G06F 21/6245 726/30 |
| 2017/0091231 | A1* | 3/2017 | DiFranco | G06F 16/93 |
| 2017/0244695 | A1 | 8/2017 | Lund et al. | |
| 2018/0053253 | A1* | 2/2018 | Gokhale | G06Q 40/03 |
| 2018/0083931 | A1* | 3/2018 | Baig | H04L 63/0428 |
| 2018/0108105 | A1* | 4/2018 | Duesterwald | G06F 17/16 |
| 2018/0158139 | A1* | 6/2018 | Krajicek | G06Q 30/04 |
| 2018/0176192 | A1* | 6/2018 | Davis | H04L 63/166 |
| 2018/0218121 | A1 | 8/2018 | Gassner et al. | |
| 2018/0218159 | A1* | 8/2018 | Smith, III | G06F 21/602 |
| 2018/0260576 | A1 | 9/2018 | Miguel | |
| 2018/0332016 | A1 | 11/2018 | Pandey et al. | |
| 2019/0238321 | A1 | 8/2019 | Park et al. | |
| 2020/0067907 | A1 | 2/2020 | Avetisov et al. | |
| 2020/0153814 | A1 | 5/2020 | Smolny et al. | |
| 2020/0372175 | A1* | 11/2020 | Sundaram | G06N 3/02 |
| 2021/0004479 | A1* | 1/2021 | Ithal | H04L 9/0897 |

OTHER PUBLICATIONS

Cheusheva, "Excel IF function: nested IF formulas with multiple conditions, IFERROR, IFNA and more," Apr. 27, 2017 (available at https://web.archive.org/web/20170420035147/https://www.ablebits.com/office-addi ns-blog/2014/12/03/excel-if-function-iferrror-ifna/) (Year: 2017).

Cheusheva, Using IF function in Excel: formula examples for numbers, text, dates, blank cells, Apr. 27, 2017 (available at https://web.archive.org/web/20170420035257/https://www.ablebits.com/office-addins-blog/2014/11/26/if-function-excel/) (Year: 2017).

N. Naik and P. Jenkins, "Securing digital identities in the cloud by selecting an apposite Federated Identity Management from SAML , OAuth and OpenID Connect," 2017 11th International Conference on Research Challenges in Information Science (RCIS), Brighton, UK, 2017, pp. 163-174. (Year: 2017).

OASIS. "Security Assertion Markup Language (SAML) V2.0 Technical Overview", Sep. 2005. (Year: 2005).

NPL Search—Google Scholar (Year 2023).

* cited by examiner

SECURING LENDER OUTPUT DATA

CROSS-REFERENCE TO RELATED APPLICATIONS AND INCORPORATION BY REFERENCE

This application is a Continuation application of Ser. No. 17/196,738, filed Mar. 9, 2021, which is a Continuation Application of U.S. patent application Ser. No. 16/882,274, filed May 22, 2020, which claims priority to U.S. Provisional Application 62/852,202, filed May 23, 2019. The contents of each of these applications are incorporated herein by reference in their entirety.

BACKGROUND

Encrypting data can provide security by preventing exposure of sensitive information. However, this security comes at the sacrifice of data manipulation and reformatting capabilities. For example, in a data object or file that is encrypted at the object or file level, data within the object or file cannot be manipulated or reformatted to be stored in a different data structure or file format without first decrypting the data object or file. Appropriate decryption and encryption keys are required to decrypt and re-encrypt an encrypted data object or file during the reformatting process. Entities that do not have the required keys and receive an encrypted data object or file in transit to a final destination are unable to manipulate the encrypted object or file.

BRIEF SUMMARY

A method of encrypting data in a flexible format comprises receiving a request comprising applicant data and processing the applicant data to generate lender output data. The lender output data may comprise sensitive data and non-sensitive data. The method may further comprise encrypting the sensitive data, using a first data key, while leaving the non-sensitive data unencrypted and storing the lender output data in a data object formatted in a first format. The data object may comprise a first data element, a second data element comprising the non-sensitive unencrypted data, and encryption metadata. The encryption metadata may comprise the encrypted sensitive data, a first path identifying the first data element in the first format, and an encrypted data key.

The method may further comprise authenticating with an encryption service and receiving, from the encryption service, the first data key and the encrypted data key. The first data key may comprise a symmetric encryption key and the encrypted data key may comprise the first data key encrypted using a master key.

The method may further comprise discarding the first data key after the encrypting.

The method may further comprise reformatting the data object in a second format, different from the first format. The reformatting may comprise storing the second data element of the first format in a corresponding data element in the second format and storing the encrypted sensitive data and the encrypted data key in encryption metadata of the second format. The reformatting may further comprise storing a second path identifying a first element of the second format in the encryption metadata of the second format. The first path is different from the second path or a path identifying the second data element in the first format is different from a path identifying the corresponding data element in the second format.

The method may further comprise retrieving the encrypted data key from the encryption metadata of the data object. The method may further comprise performing authentication with an encryption service, sending the encrypted data key to the encryption service, and receiving a decrypted data key from the encryption service. The method may further comprise decrypting the data object using the decrypted data key.

The method may further comprise sending the decrypted data object to the applicant.

The sending of the decrypted data object comprises sending the decrypted data object using transport layer security or secure sockets layer.

In some embodiments, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

The embodiments disclosed herein relate to encrypting data objects or files in a manner that allows the contents of the data objects or files, including encrypted contents, to be mapped to a new data object having a different data structure or format. This encryption approach may be useful, for example, in a scenario in which an application is split into three or more separate layers. The first layer may receive unencrypted data and encrypt the data before sending an encrypted copy of the data to an intermediate layer. The intermediate layer may not have the ability to decrypt the encrypted data but can perform mapping operations on the encrypted data. The mapping may comprise transforming the structure of the encrypted data, reformatting the data object or file into a new format, or moving the contents into a data object having a different data structure. The intermediate layer then sends the reformatted data object to a third layer. The third layer may decrypt the reformatted data object to recover the encrypted data. In the disclosed embodiments, the mapping is discussed in relation to changing the structure of the data object. However, it is intended, and one of ordinary skill in the art would understand, that the principles described herein may be applicable to mapping an object to a different data format or file format. For example, a file formatted as JavaScript Object Notation (JSON) with encrypted values may be reformatted as an Extensible Markup Language (XML) file with encrypted values, without decrypting the encrypted values.

Figure 1:
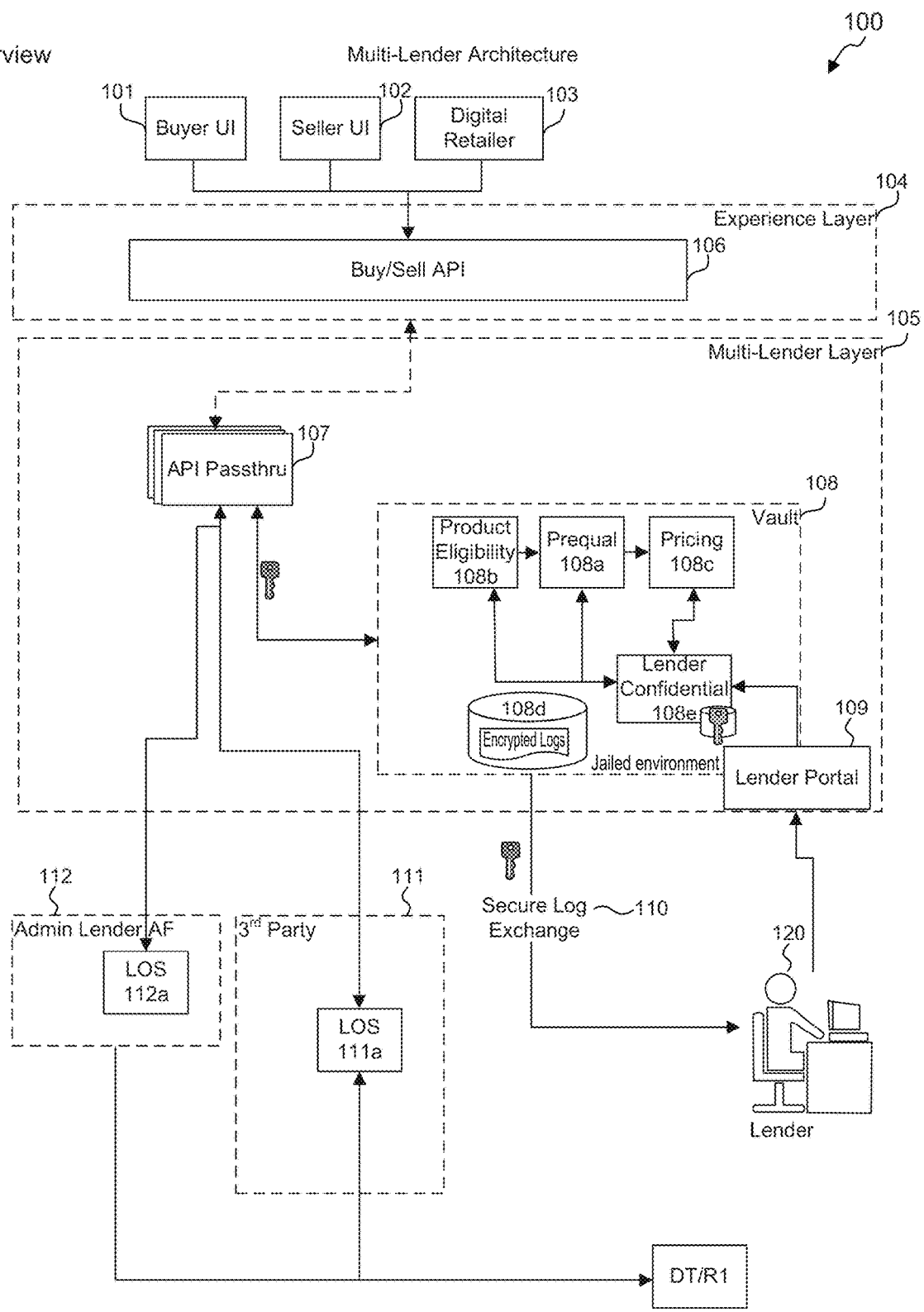
FIG. 1 is a block diagram of a multi-lender architecture according to an embodiment.

FIG. 1 is a block diagram of a multi-lender architecture 100 according to an embodiment.

In some embodiments, the multi-lender architecture 100 may include a plurality of interactive micro-services that communicate with one another in a bi-directional manner to create a normalized process for purchasing and financing a product, such as a vehicle. The normalized process may include prequalifying one or more applicants for a loan with a plurality of lenders to purchase the product and calculating pricing details for each loan that would be offered by each lender based on an applicant's credentials. In some aspects, the pricing may be for a specific vehicle selected by the applicant or across a range of vehicles available in an inventory. Availability of a vehicle for each lender may vary based on relationships between each lender and associated dealerships or lender specific policies based on credit score, vehicle, geography, etc. That is, the multi-lender architecture 100 provides for an end-to-end architecture that tailors applicant-specific credentials to be analyzed against lender specific requirements and performs the analysis to guide the customer and lenders through the steps of prequalifying the customer, determining vehicle eligibility, determining vehicle pricing, and providing a credit application from the applicant to a selected lender. The multi-lender architecture may also be configured to host a plurality of insurer decisioning rules and generate insuring decisions based on customer application information. The multi-lender architecture may be configured to operate in any industry where different providers have unique rules for making insurance decisions and determining pricing.

As illustrated in FIG. 1, the multi-lender architecture 100 may include an experience layer 104 and a multi-lender layer 105. In some embodiments, the experience layer 104 may be accessed via numerous user interfaces (UIs), which may be executed on a client device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. For example, the UIs may include buyer UI 101, seller UI 102, and/or digital retailer UI 103. According to some embodiments, the multi-lender layer 105 may correspond to the first layer, and the experience layer 104 may correspond to the intermediate layer. The buyer UI 101, seller UI 102, or digital retailer UI 103 may correspond to third layer. In some embodiments, a customer may use a personal client device to log in using the buyer UI 101 or the digital retailer UI 103. Similarly, a dealer or digital retailer may use a client device to log in using the seller UI 102. After logging in, the customer or the dealer may interact with the multi-lender architecture 100 via the experience layer 104, through a Buy/Sell application programming interface (API) 106. For example, the experience layer 104 may display information to the customer, dealer, or digital retailer in a lender agnostic format. That is, information may be displayed to the customer, dealer, or digital retailer on the client device in a universal, applicant-friendly format using the experience layer 104. For example, the information may include application forms, prequalification results from lenders, pricing on eligible vehicles for purchase, or the like. In some embodiments, the experience layer 104 may communicate with the multi-lender layer 105. For example, an API Passthru 107 of the multi-lender layer 105 may communicate with the Buy/Sell API 106 of the experience layer 104.

In some embodiments, the multi-lender architecture 100 may be associated with a financial institution (e.g., bank or lender), which may provide its own lending platform 112. The lending platform 112 may include a loan origination system 112a. In some embodiments, the UIs 101-103 may communicate back and forth with the loan origination system 112a to generate a loan offer from the financial institution via the Buy/Sell API 106 and the API Passthru 107. In some embodiments, the lending platform 112 may receive rule sets, from the financial institution, for prequalifying an applicant, determining product eligibility, and determining pricing for the product. In some embodiments, one or more lenders may upload (e.g. through lender portal 109) to the multi-lender architecture 100, rule sets for pre-qualification, vehicle eligibility, and/or pricing, to enable generation of a respective loan offer for each of the lenders. The rule sets may be stored and processed within vault 108. In some embodiments, the UIs 101-103 may communicate in parallel with the vault 108 and with the loan origination system 112a to generate a loan offer from the financial institution and/or one or more other third-party lenders, as discussed below. The loan offers from the lending platform 112 may be presented alongside the loan offers from third-party lenders 111 on the UIs 101-103.

In some embodiments, the multi-lender architecture 100 may include a third-party API 111 including a third-party loan origination system 111a. In the case a lender does not upload to the multi-lender architecture 100, rule sets for pre-qualification, vehicle eligibility, and/or pricing, the third-party loan origination system 111a may generate a loan offer for the lender. The third-party loan origination system 111a may communicate with the UIs 101-103 via the Buy/Sell API 106 and the API Passthru 107 to generate a loan offer, in parallel, with the micro-processes (e.g., pre-qualification microservice 108a, product eligibility microservice 108b, and pricing microservice 108c). The loan offers from the third-party 111 API may be presented alongside the loan offers from the other lenders on the UIs 101-103.

As shown in FIG. 1, the multi-lender layer 105 may include the vault 108, which may include a prequalification microservice 108a, a product eligibility microservice 108b, a pricing microservice 108c, an encrypted log (e.g., a data repository) 108d, and a lender confidential repository 108e. It should be understood, by those of ordinary skill in the art, that these microservices and repositories are merely examples, and that the multi-lender architecture 100 may include other microservices and repositories in accordance with aspects of the present disclosure. In some embodiments, the vault 108 may be accessed by a plurality of lenders 120 (only one shown in FIG. 1) using a lender portal 109 to provide one or more proprietary rule sets for pre-qualifying an applicant, determining vehicle eligibility for financing, and determining pricing information for each eligible vehicle.

Rule sets may include pre-qualification rules, loan eligibility rules, lending rules, filing policies, lending policies or any criteria or sensitive lender data applied to applicant data in processing lending decisions within the vault 108. The vault 108 may process the prequalification, vehicle eligibility, and pricing information associated with building a loan offer for multiple lenders, in parallel, using the rule sets provided by each lender.

Additionally, as the vault 108 processes the information for multiple lenders 120, the loan origination system 112a and/or third-party loan origination system 111a may simultaneously process the loan application. In this way, the multi-lender architecture 100 may assess applicant eligibility and vehicle eligibility, as well as pricing for eligible vehicles (e.g., personalized interest rates and monthly payments), for any number of lenders in parallel. The vault 108 may reside in a jailed, self-contained network, configured to receive and transmit data in an encrypted format. In some embodiments, the vault 108 may be a multi-tenant arrangement within a larger multi-tenant arrangement. In this self-contained network, lenders may manage their own separate accounts. Each lender may be able to securely manage its loan eligibility rules, lending rules, filing policies, and/or the like. Lenders may view their own data inside the vault 108 and may not view data associated with other lenders. Furthermore, data inside the vault 108 may not be visible to consumers through the UIs 101-103, or any other interface.

Figure 2:
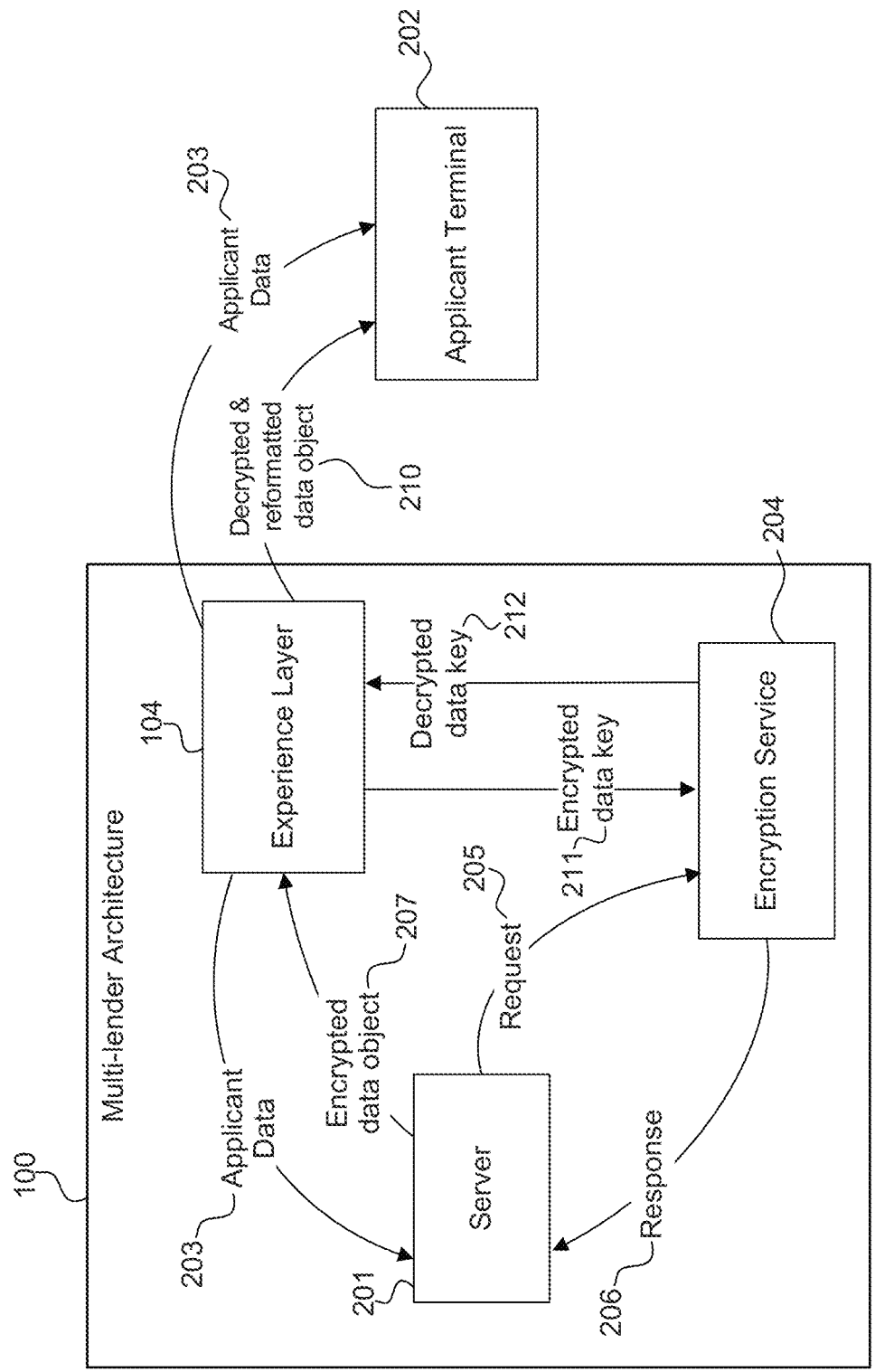
FIG. 2 is a block diagram illustrating an operation of a lender portal according to an embodiment disclosed herein.

FIG. 2 is a block diagram illustrating encryption, transmission, and decryption according to embodiments disclosed herein.

Some embodiments of the flexible format encryption system may be illustrated with reference to a server 201, an applicant terminal 202, an experience layer 104, and an encryption service 204. According to an embodiment, the server 201 is configured to use the encryption service 204 to perform encryption or to generate encryption keys.

According to an embodiment, the applicant terminal 202 sends applicant data 203 to the server 201 through the experience layer 104. The server 201 may apply one or more lender rule sets to the applicant data to pre-qualify the applicant and determine loan and/or product eligibility. The lender output data may comprise a loan offer. The lender output data may be secured in transit to the applicant according to embodiments disclosed herein. One purpose for securing the lender output data is to prevent exposure of the lender output data to the admin lender platform 112, other lenders participating in the multi-lender architecture 100, and/or a third party lender 111. Exposure of the lender output data may allow reverse engineering of lender rule sets and may undermine efforts to comply with legal anti-trust requirements.

According to an embodiment, the server 201 may authenticate with the encryption service 204. According to an embodiment, the encryption service 204 manages generation of data keys and encryption of data keys using a master key. Each lender may be associated with a unique master key. Authentication may help to ensure that access to one lender's master key is not granted to another lender. The server 201 may send a request 205 to the encryption service 204. The request 205 may comprise a request for an encryption key. According to an embodiment, the encryption service 204 returns a response 206 to the server 201. The response 206 may comprise a data key and/or an encrypted data key. The data key may be a symmetric encryption key generated from a secure asymmetric master key, and the encrypted data key may be the symmetric encryption key encrypted using the master key.

According to an embodiment, the server 201 may store the lender output data in a data object to be transmitted back to the applicant terminal 202. The server 201 may be configured to use the data key to encrypt the data object. Encryption may be performed at the field level, which enables the experience layer 104 to transform the data object containing encrypted data without decrypting the data object. As a non-limiting example, a data object having a first format may have the following class definition:

```
class ExampleDataObject {
    @Encrypt
    private String sensitiveInfo;
    private String nonSensitiveInfo;
    private ExampleNestedObject exampleNestedObject;
}
class ExampleNestedObject {
    @Encrypt
    private Integer encryptThis;
    private Integer dontEncryptThis;
}
```

The fields that need to be encrypted may be annotated with an encryption indicator or flag to indicate which fields require encryption. As a non-limiting example, a custom annotation, @Encrypt, may be included in a class definition of the data object. The encryption indicator or flag may identify one or more data elements containing sensitive data to be encrypted. Data elements of a data object may be any of a variety of data types, including another data object. An instance of a data object having the first format may be represented in plain text as follows:

```
"exampleDataObject": {
    "sensitiveInfo": "the secret password is 1234",
    "nonSensitiveInfo": "Capital One is on a mission to change banking for good",
    "exampleNestedObject": {
        "encryptThis": 1234,
        "dontEncryptThis": 5678
    }
}
```

A data object may comprise a structure with one or more data elements. Each data element may be represented by a pair comprising a name field and a value field. The name may be a string contained in quotation marks and the value may comprise a number, a string, a Boolean, an array, or a data object. According to an embodiment, the data object may be represented using the JavaScript Object Notation (JSON) standard.

According to an embodiment, the server 201 may encrypt the values identified by the @encrypt flag using the data key. A non-limiting example encrypted data object, having the first format, may be expressed in plain text as follows:

```
"encryptedDataObject": {
    "sensitiveInfo": "",
    "nonSensitiveInfo": "Capital One is on a mission to change banking for good",
    "exampleNestedObject": {
        "encryptThis": 0,
        "dontEncryptThis": 5678
    },
    "encryptionMetadata": {
        "encrypted.sensitiveInfo": "ABCEFGHIJKABCD123456"
        "encrypted.exampleNestedObject.encryptThis":
        "ABCEFGHIJKEFGHIJ4566"
        "key.ABCEFGHIJK":
        "ABCEFGHIJKRWEGWEFVADGFAEFG235DF4"
    }
}
```

Although not all data elements of the data object are necessarily encrypted, for convenience, a data object with one or more encrypted values may be referred to as an encrypted data object 207. In the encrypted data object 207, each encrypted field may have its value replaced with an appropriate zero value or null. For example, if the encrypted field is a string, the zero value may be an empty String, and if the encrypted field is an integer, the zero value may be 0, etc. The encrypted values may be added to an embedded field in the encrypted data object 207 named encryptionMetadata. Each encrypted value may be added to the encryptionMetadata field along with the path to the field corresponding to the encrypted value. According to an embodiment, the path may be stored in a name field of a data element in the encryptionMetadata of the encrypted data object 207. In the example encrypted data object, the path is also prefixed with the word "encrypted", indicating that an encrypted value is stored in the value field associated with the name field containing the path. For example, the path "encrypted.sensitiveInfo" indicates that the value field containing the encrypted value "ABCEFGHIJKABCD123456" corresponds to the field named "sensitiveInfo" at the top level of the example encrypted data object. The encrypted data key may also be stored in the encryptionMetadata field.

According to an embodiment, any of the encrypted field values stored in the encryptionMetadata field, including the encrypted data key, may be appended with a decryption identifier. In the example encrypted data object above, the decryption identifier comprises the characters "ABCDEFGHIJK" added as a prefix to the encrypted values stored in the encryptionMetadata field, including the encrypted data key. According to an embodiment, the decryption identifier may be used to identify the master key used to generate the data key and to encrypt the data key. During a decryption process, the master key may be used for decrypting the encrypted data key to recover the data key. The recovered data key may then be used to decrypt the encrypted field values stored in the encryptionMetadata field. After encrypting the data object, the server 201 may send the encrypted data object 207, including the encrypted data key, to an experience layer 104.

The experience layer 104 may be unable to decrypt the encrypted data object, but may be able to reformat the encrypted data object 207 through a mapping operation. The mapping operation may create a dynamic proxy around both the original encrypted data object 207 and a new reformatted data object 210 that will contain the encrypted fields. These dynamic proxies may enable the ability to capture the paths identifying the encrypted fields to be mapped. Once a path from the original encrypted data object 207, and a new path for the new reformatted data 210 object are captured, a value may be copied from the embedded encryptionMetadata field in the original encrypted object to the encryptionMetadata field of the new object. The copied value may be associated with the new path to the corresponding field in the new object. After the mapping operation is applied, the resulting reformatted data object 210 can be decrypted in the same manner as the original encrypted data object by using a decrypt method of the embodiments disclosed herein.

As a non-limiting example, an example reformatted data object with a second format may have a class definition as follows:

```
class ReformattedObject {
    private String sensitiveString;
    private String nonSensitiveString;
    private Integer sensitiveInteger;
    private Integer nonSensitiveInteger;
}
```

One difference between the example reformatted data object and the original example encrypted data object is that the example reformatted data object lacks a nested object, e.g., ExampleNestedObject. However, like the original example encrypted data object, the example reformatted data object comprises two string data elements and two integer data elements.

As a non-limiting example of the mapping operation, refer to the plain text representation of the original example encrypted data object, repeated here for convenience:

```
"encryptedDataObject": {
    "sensitiveInfo": "",
    "nonSensitiveInfo": "Capital One is on a mission to change banking for good",
    "exampleNestedObject": {
        "encryptThis": 0,
        "dontEncryptThis": 5678
    },
    "encryptionMetadata": {
        "encrypted.sensitiveInfo": "ABCEFGHIJKABCD123456"
        "encrypted.exampleNestedObject.encryptThis":
    "ABCEFGHIJKEFGHIJ4566"
        "key.ABCEFGHIJK":
        "ABCEFGHIJKRWEGWEFVADGFAEFG235DF4"
    }
}
```

When the original example encrypted data object is reformatted to the second format, the example reformatted data object may be represented in plain text as follows:

```
"reformattedDataObject": {
    "sensitiveString": "",
    "nonSensitiveString": "Capital One is on a mission to change banking for good",
    "sensitiveInteger": 0,
    "nonSensitiveInteger": 5678,
    "encryptionMetadata": {
        "encrypted.sensitiveString": " ABCEFGHIJKABCD123456"
        "encrypted.sensitiveInteger": "ABCEFGHIJKEFGHIJ4566"
        "key.ABCEFGHIJK":
        "ABCEFGHIJKRWEGWEFVADGFAEFG235DF4"
    }
}
```

As shown in the encryptionMetadata field of the example reformatted data object, the paths identifying the locations of the encrypted fields have changed. The path encrypted.sensitiveInfo in the original example encrypted data object has become encrypted.sensitiveString in the example reformatted data object, and the path encrypted.exampleNestedObject.encryptThis in the original example encrypted data object has become encrypted.sensitiveInteger in the example reformatted data object. A difference in structure or format may result in the paths stored in the reformatted data object 210 being different from the paths stored in the original encrypted data object 207.

The experience layer 104 may decrypt the reformatted data object 210 and send the decrypted reformatted data object 210 to the applicant terminal 202. To decrypt a data object that was encrypted according to embodiments disclosed herein, the experience layer 104 may parse the encryptionMetadata field and retrieve the embedded encrypted data key 211. The experience layer may authenticate with the encryption service 204 and may send the encrypted data key 211 to the encryption service 204. One benefit of decrypting the reformatted data object at the experience layer 104 may be that the applicant terminal 202 is not required to establish an identity with the encryption service 204 and authenticate with the encryption service 204 in order to receive lender output data from the server 201. The experience layer 104 may also operate as a buffer that may eliminate the risk of unencrypted sensitive lender output data being stored at the server 201.

The encryption service 204 may use an encryption identifier appended to the encrypted data key 211 to identify the correct master key for decrypting the encrypted data key 211. According to an embodiment, the decryption identifier comprises a prefix on the encrypted data key. The decryption identifier may match a number of characters of the master key. The encryption service 204 may use the master key to decrypt the encrypted data key 211 and return the decrypted data key 212 to the experience layer 104. The experience layer 104 may use the decrypted data key 212 to decrypt the reformatted data object 210 and recover the data object containing the lender output data. The experience layer may send the decrypted reformatted data object 210 containing the lender output data to the applicant terminal 202.

Figure 3:
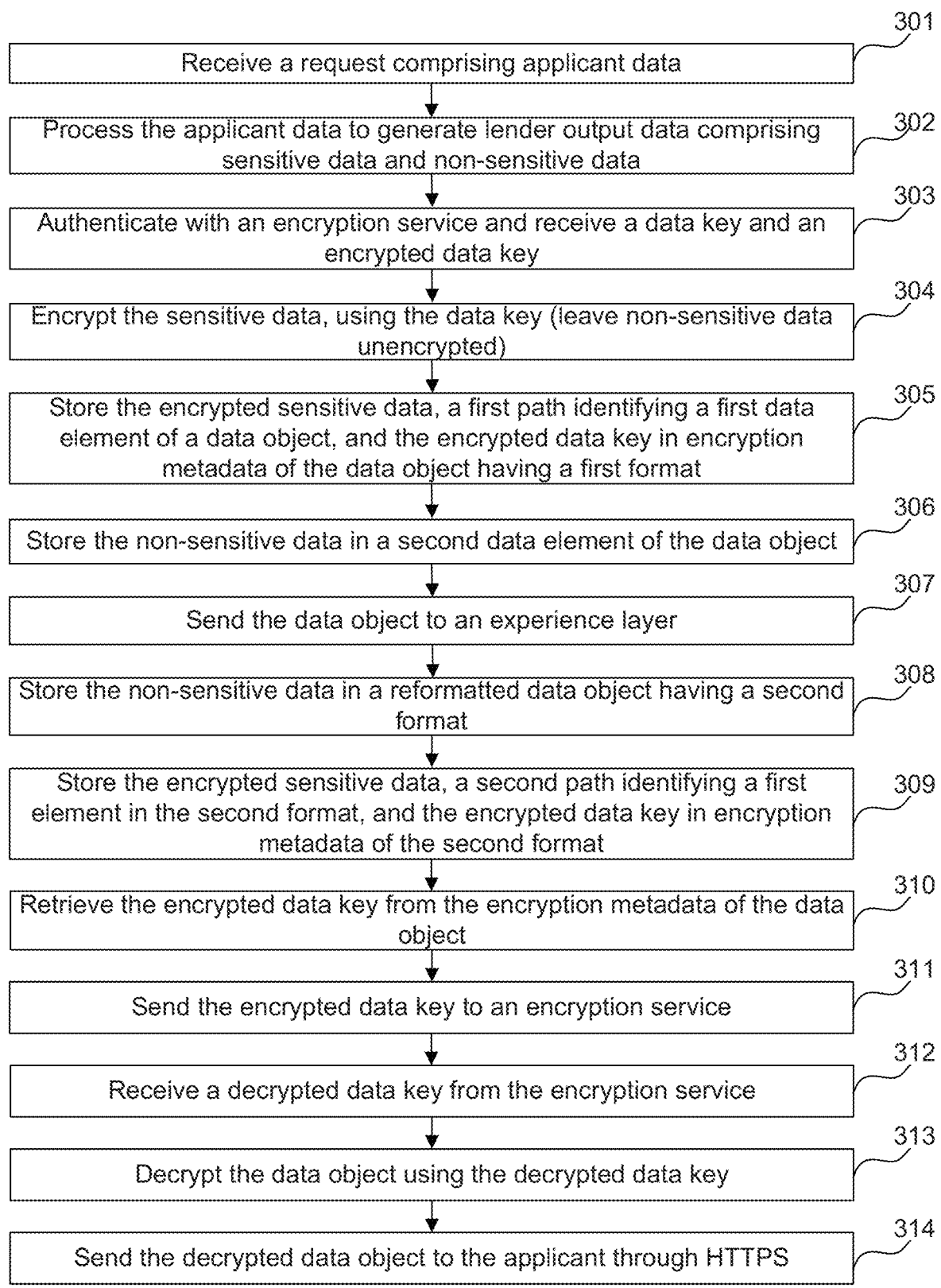
FIG. 3 is a flow chart illustrating steps of encrypting and transmitting lender output data according to embodiments disclosed herein.

FIG. 3 is a flow chart illustrating steps of encrypting and transmitting lender output data according to embodiments disclosed herein.

At step 301, one or more processors may receive a request comprising applicant data. The request may be sent from the applicant terminal 202 to the experience layer 104. The experience layer 104 may send the request, including the applicant data to the server 201.

At step 302, the one or more processors may process the applicant data using a lender's rule sets to generate lender output data. The processing of the applicant data may be performed by the server 201 according to embodiments of the multi-lender architecture 100 disclosed herein. The lender output data may comprise one or more of pre-qualification results, loan eligibility information, vehicle eligibility information, a loan offer, and/or pricing information and may comprise both sensitive and non-sensitive data.

At step 303, the one or more processors authenticates with the encryption service 204, and receives a data key and an encrypted data key from the encryption service 204. The encryption service 204 may generate the data key using a master key unique to the lender whose rule sets were used to generate the lender output data. The data key may be a symmetric encryption key, the master key may be an asymmetric encryption key, and the encrypted data key may be the data key encrypted using the master key.

At step 304, the server 201 may encrypt the sensitive data of the lender output data using the data key. The server 201 may leave the non-sensitive data of the lender output data unencrypted. The encryption of the sensitive data may be performed by the server 201 within the vault 108 in order to prevent exposure of the lender output data to the admin lending platform 112, other lenders using the multi-lender architecture 100, or the third-party lenders 111.

At step 305, the one or more processors may store the encrypted sensitive data in encryption metadata of a data object having a first format. The data object may comprise a first data element, a second data element, and the encryption metadata. The one or more processors may also store a path identifying the first data element of the data object, and the encrypted data key in the encryption metadata of the data object. The path identifying the first data element may identify a location of the first data element in the data object having the first format.

At step 306, the one or more processors may store the non-sensitive data in the second data element of the data object. It should be understood to those of ordinary skill in the art that the data object may include any number of data elements. Data elements storing sensitive data may be encrypted and the encrypted sensitive data may be stored in the encryption metadata with paths to the corresponding data elements, while non-sensitive data may be stored in unencrypted data elements of the data object.

At step 307, the one or more processors may send the data object to the experience layer. The experience layer may be configured to reformat, and/or decrypt the data object.

At step 308, the one or more processors may store the non-sensitive data in a reformatted data object having a second format. The reformatted data object having the second format may include data elements sufficient for storing all sensitive data and non-sensitive data from the data object of the first format.

At step 309, the one or more processors may store the encrypted sensitive data in encryption metadata of the reformatted data object having the second format. The one or more processors may store the encrypted data key and a second path in the encryption metadata of the second format. The second path may identify a location of a first data element in the reformatted data object having the second format. The second path may be different from the first path. The name of the first and/or second data element of the original data object may be different from the name of the first and/or second data element of the reformatted data object.

At step 310, the one or more processors may retrieve the encrypted data key from the encryption metadata of the data object. The process of decryption may be independent of the specific format of the data object. Therefore, although the decryption process is described with reference to the data object, the decryption steps also apply to the reformatted data object or a data object reformatted to any format comprising metadata storing the encrypted data key, the encrypted sensitive data, and paths identifying the locations of the encrypted values in the data object. According to an embodiment, the mapping of data elements in the first structure to corresponding data elements in the second structure may be performed based on matching names of the data elements. According to another embodiment, the mapping may be performed based on a predetermined set of rules for mapping objects or files of a first known structure or format to a second known structure or format.

According to an embodiment, the mapping may be performed based on hard coded mapping instructions in a call to a mapping function. For example a function call to a map( ) function of an encryption SDK may explicitly map the data elements between the two structures as follows:

```
MappedObject mappedObject =
  encryptionSdk.map(exampleObject, new MappedObject( ),
    (example, mapped) ->
    mapped.setSensitiveString(example.getSensitiveInfo( ))
      .setNonSensitiveString(example.getNonSensitiveInfo( ))
      .setSensitiveInteger(example.getExampleNestedObject(
        ).getEncryptThis( ))
      .setNonSensitiveInteger(example.getExampleNestedObject(
        ).getDontEncryptThis( ))
  );
```

At step 311, the one or more processors may send the encrypted data key to the encryption service 204. The encryption service 204 may use a decryption identifier to determine a master key to use for decrypting the encrypted data key. According to an embodiment, the decryption identifier comprises a set of characters, appended to the encrypted data key, which match a set of characters of the master key.

At step 312, the one or more processors receive the decrypted data key from the encryption service 204. According to an embodiment, the data key is a symmetric encryption key and the decrypted data key is identical to the data key.

At step 313, the one or more processors use the decrypted data key to decrypt the sensitive data in the encryption metadata of the data object. The decrypted sensitive data may be stored in a data element of the data object which is identified by the path, associated with the encrypted sensitive data, in the encryption metadata.

At step 314, the one or more processors may send the decrypted data object to the applicant. The decrypted data object may be sent to the applicant through HTTPS, using standard encryption techniques such as Secure Sockets Layer (SSL) or Transport Layer Security (TLS). One benefit of sending the decrypted object to the applicant using standard encryption mechanisms, such as HTTPS, is that the applicant's terminal can use security methods that are built into the web browser and custom software installations are not required on the applicant terminal in order to decrypt the data object.

Figure 4:
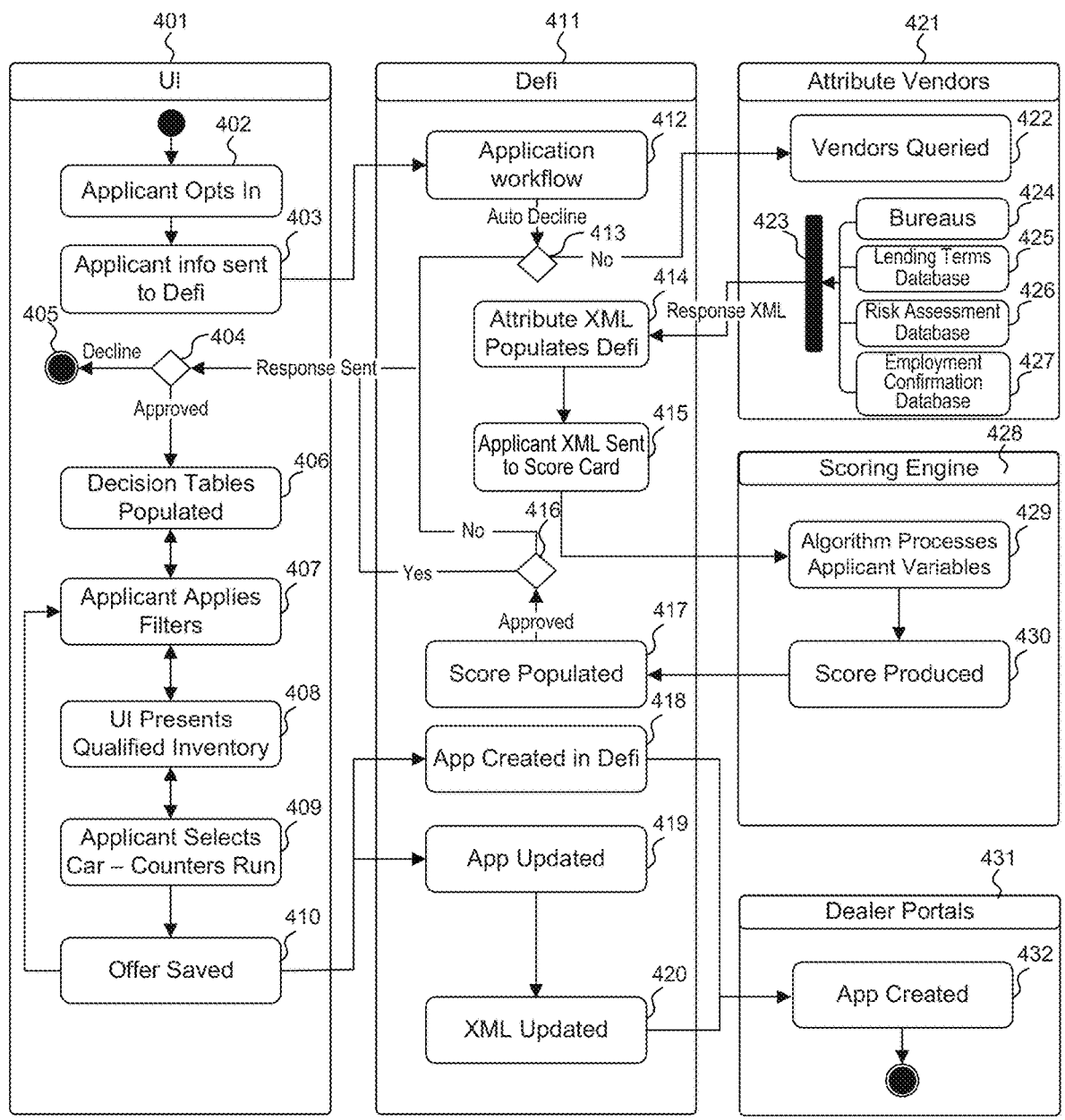
FIG. 4 is an example process flow diagram for obtaining pricing information for an automobile loan from a lender using the multi-lender architecture according to an embodiment.

FIG. 4 is an example process flow diagram for obtaining pricing information for an automobile loan from a lender using the multi-lender architecture 100 according to an embodiment.

A user may interface with UI 401 (e.g., Buyer UI 101 or Seller UI 102) to initiate an application for a loan for an automobile. The UI 401 may correspond to the third layer of an application implementing the encryption approach described herein. In operation 402, an applicant may opt-in to initiating an application for an automobile loan. In operation 403, the applicant may input personal information in the application using the UI 401 and submit the application. Operations 402 and 403 may correspond to step 301 of FIG. 3. The application workflow 412 may be initiated in response to receiving an application from the applicant, in the data entry file inquiry (Defi) module 411. Application workflow 412 may correspond to step 302 of FIG. 3 and may be performed in the first layer of the application implementing the encryption approach described herein.

In operation 413, the multi-lender architecture 100 may determine whether the multi-lender architecture 100 may automatically decline the applicant based on the personal information on the application. In this example, the multi-lender architecture 100 may automatically decline the applicant for an automobile loan. A response indicating the declining of the applicant for the automobile loan may be transmitted to the UI 401.

In operation 422, in response to determining the applicant may not be automatically declined for the automobile loan, in operation 421 the multi-lender architecture 100 may query third party attribute vendors 421 such as bureaus (e.g., credit bureaus), a lending terms database 425, a risk assessment database 426, and an employment confirmation database 427. The attributes vendors 421 may transmit a response to the query in operation 423. In operation 414, an attribute XML may populate the Defi 411 with the response from the attribute vendors.

In operation 415, the applicant attribute XML, may be transmitted to a score card. In operation 429, the algorithm processes applicant variables in the scoring engine 428. In operation 430, a score may be generated based on processing an algorithm using the applicant's variables. The applicant may have different variables for each lender. In operation 417, the score may be populated. The multi-lender architecture 100 may determine whether the applicant is approved for an automobile loan based on the score. The multi-lender architecture 100 may transmit a response to the UI indicating the approval or rejection for the automobile loan in operation 416. Like application workflow 412, operation 416 may also correspond to step 302 of FIG. 3, as outputs related to lending decisions may be considered sensitive lender output data to be secured when transmitted to the UI 401.

The response sent to UI 401 may use the encryption approach described herein to secure lender output data sent from Defi 411 to the UI 401. In one non-limiting example, the Defi 411 may encrypt the output of application workflow 412 or the output of operation 416 according to steps 303-307. The response sent to 404 (according to step 307) may be sent through the experience layer 104, which may correspond to the intermediate layer previously discussed. The experience layer 104 may perform steps 308-309 of FIG. 3 after receiving the response at 404. The experience layer is not shown in FIG. 4.

After receiving the response from the Defi 411 at operation 404, the UI may perform steps 310-314 of FIG. 3 to decrypt and extract the sensitive lender output data. In operation 404, the UI 401 may use the decrypted lender output data to determine whether the applicant was approved or rejected. In response to being rejected, the UI 401 may indicate the rejection to the applicant in operation 405. In operation 406, in response to being approved for an automobile loan, decision trees may be populated. In operation 407, applicant may apply filters for searching automobiles to purchase. In operation 408, the UI's 401 user interface may render a selection of automobiles eligible for purchase and for which the applicant is pre-qualified. In operation 409, the UI 401 may select an automobile from the selection of automobiles. In operation 410, the UI 401 may save the offer for the automobile loan for the selected automobile. In operation 418, the offer may be transmitted to the multi-lender architecture 100, and an application may be created in the Defi 411 for the offer. In operation 432, in the seller portals or dealer portals 431, an application may be created for the offer for the automobile loan for the selected automobile.

In operation 419, the multi-lender architecture 100 may update the application for the offer for the automobile loan for the selected automobile. In operation 420, the XML for the applicant may be updated.

Figure 5:
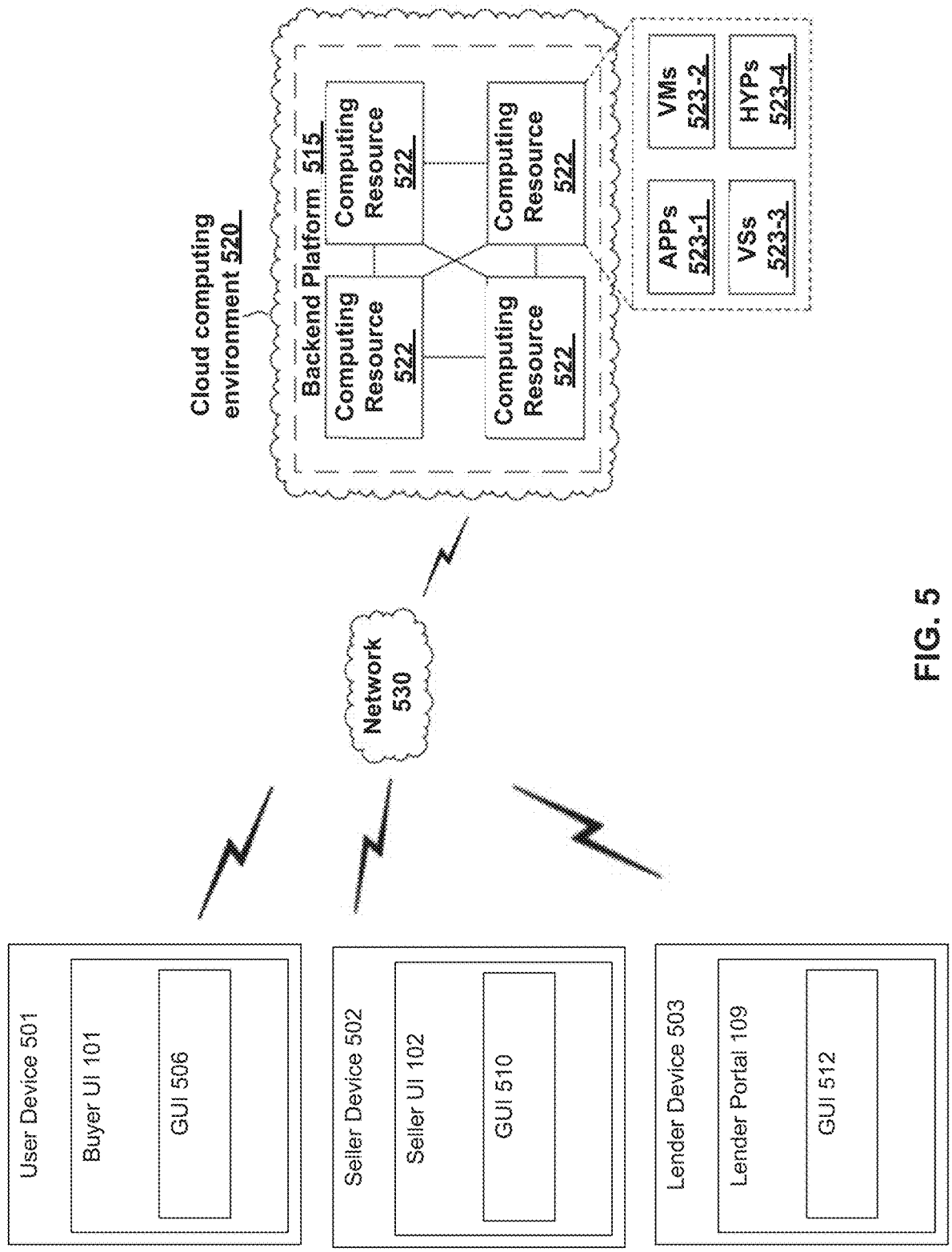
FIG. 5 is a block diagram of an example network environment suitable for some disclosed embodiments.

FIG. 5 is a block diagram of an example network environment suitable for some disclosed embodiments.

The environment 500 may include a user device 501, a seller device 502, and a lender device 503, a backend platform 515, a cloud computing environment 520, and a network 530. The devices of the environment 500 may be connected through wired connections, wireless connections, or a combination of wired and wireless connections.

In an example embodiment, one or more portions of the network 530 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 515 may include one or more devices configured to host the multi-lender architecture 100. The backend platform 515 may include a server 201 or a group of servers. In an embodiment, the backend platform 515 may be hosted in a cloud computing environment 520. It may be appreciated that the backend platform 515 may not be cloud-based, or may be partially cloud-based.

The user device 501, seller device 502, and lender device 503 may include one or more devices configured to interface with the backend platform 515. The user device 501 may include a Buyer UI 501; the seller device 502 may include a Seller UI 502 application; and the lender device 503 may include a lender portal 509. The Buyer UI 501 and the Seller UI 502 application, as described with respect to FIG. 5, may be used by users to receive loan offers for vehicles that are intended to be purchased. The lender portal 509 may be used to access the multi-lender layer (e.g., multi-lender layer 105 as shown in FIG. 1) so that lenders may upload information associated with prequalification, product eligibility, and pricing, to the vault 108 (e.g., the vault 108 as shown in FIG. 1). Each of the user device 501, seller device 502, and lender device 503 may include a display respectively. The Buyer UI 501 may render a GUI 506 on the display of the user device 501. The Seller UI 502 application may render a GUI 510 on the display of the seller device 502. The lender portal 509 may render a GUI 512 on the display of the lender device 503.

In an embodiment, a digital retailer can be a web domain configured to access the backend platform 515 using a hyperlink. The user device 501, seller device 502, or lender device 503 can access the web domain using a web browser.

In an embodiment, the Seller UI 502 application can communicate with the user device 501. As an example, the Seller UI 502 can transmit a link to the user device 501 to initiate a prequalification request as described with respect to FIG. 5.

The cloud computing environment 520 includes an environment that delivers computing as a service, whereby shared resources, services, etc. may be provided to the devices 501, 502, 503 and/or the backend platform 515. The cloud computing environment 520 may provide computation, software, data access, storage, and/or other services that do not require end-user knowledge of a physical location and configuration of a system and/or a device that delivers the services. The cloud computing system 520 may include computer resources 522.

Each computing resource 522 includes one or more personal computers, workstations, computers, server devices, or other types of computation and/or communication devices. The computing resource(s) 522 may host the backend platform 515. The cloud resources may include compute instances executing in the computing resources 522. The computing resources 522 may communicate with other computing resources 522 via wired connections, wireless connections, or a combination of wired or wireless connections.

Computing resources 522 may include a group of cloud resources, such as one or more applications ("APPs") 522-1, one or more virtual machines ("VMs") 522-2, virtualized storage ("VS") 522-3, and one or more hypervisors ("HYPs") 522-4.

Application 522-1 may include one or more software applications that may be provided to or accessed by the user device 501, seller device 502 and the lender device 503. In an embodiment, applications may execute locally on the user device 501, seller device 502 and the lender device 503. Alternatively, the application 522-1 may eliminate a need to install and execute software applications on the user device 501, seller device 502 and the lender device 503. The application 522-1 may include software associated with backend platform 515 and/or any other software configured to be provided across the cloud computing environment 520. The application 522-1 may send/receive information from one or more other applications 522-1, via the virtual machine 222-2.

Virtual machine 522-2 may include a software implementation of a machine (e.g., a computer) that executes programs like a physical machine. Virtual machine 522-2 may be either a system virtual machine or a process virtual machine, depending upon the use and degree of correspondence to any real machine by virtual machine 522-2. A system virtual machine may provide a complete system platform that supports execution of a complete operating system (OS). A process virtual machine may execute a single program and may support a single process. The virtual machine 522-2 may execute on behalf of a user (e.g., the user device 501, seller device 502 and the lender device 503) and/or on behalf of one or more other backend platforms 515, and may manage infrastructure of the cloud computing environment 520, such as data management, synchronization, or long duration data transfers.

Virtualized storage 522-3 may include one or more storage systems and/or one or more devices that use virtualization techniques within the storage systems or devices of computing resource 522. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically stored. This may enable optimization of storage use, server consolidation, and/or performance of non-disruptive file migrations.

Hypervisor 522-4 may provide hardware virtualization techniques that allow multiple operations systems (e.g., "guest operating systems") to execute concurrently on a host computer, such as computing resource 522. Hypervisor 522-4 may present a virtual operating platform to the guest operating systems, and may manage the execution of multiple instances of a variety of operating systems and may share virtualized hardware resources.

Figure 6:
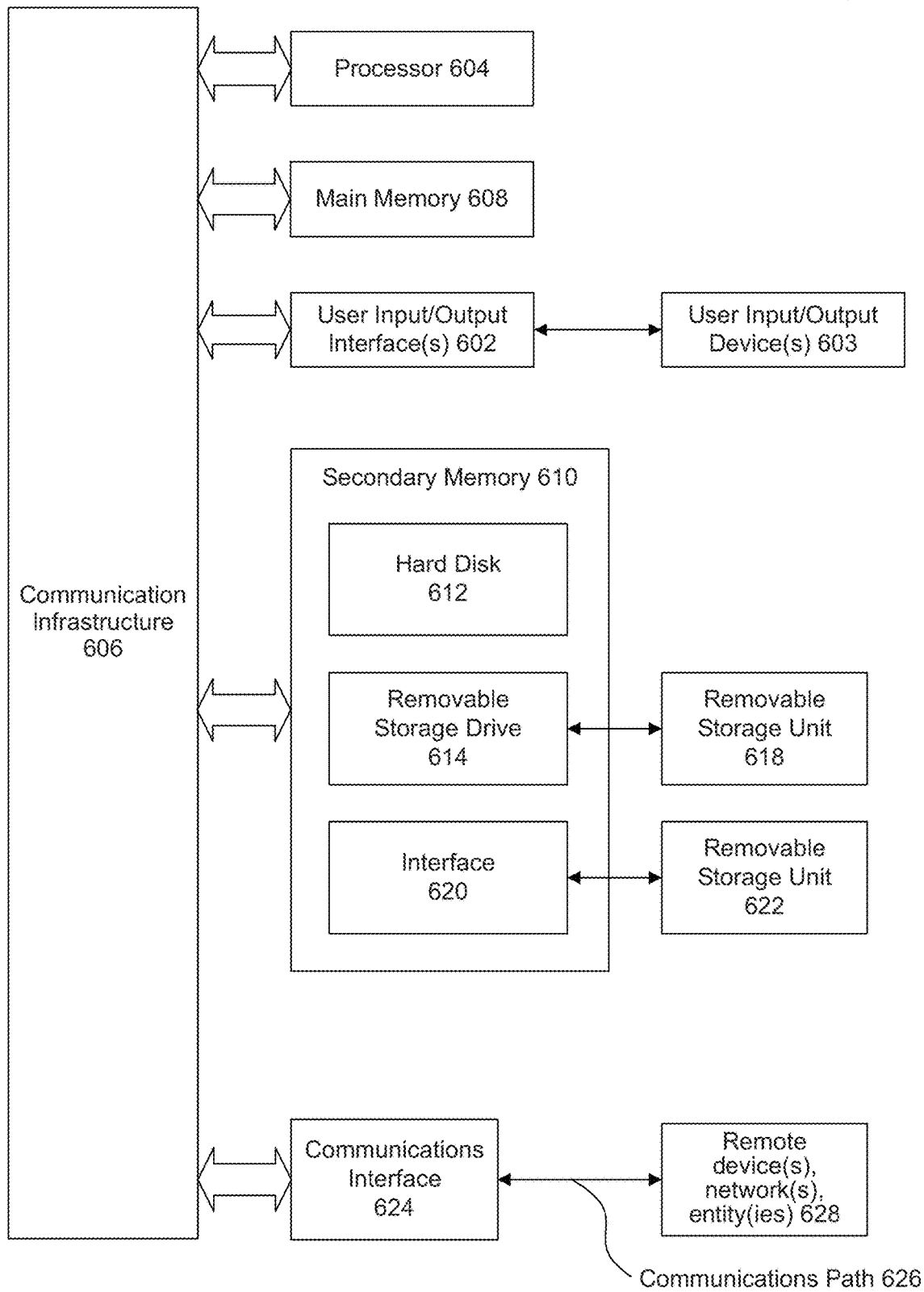
FIG. 6 is a block diagram of a non-limiting example computer system useful for implementing various embodiments disclosed herein.

FIG. 6 is a block diagram of a non-limiting example computer system useful for implementing various embodiments disclosed herein.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache and/or registers. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method for decrypting data, the method comprising:
   receiving, a data object comprising encrypted sensitive data, unencrypted non-sensitive data, a first path identifying a first data element in a first format, and an encrypted data key, wherein the encrypted sensitive data of the data object is encrypted using an unencrypted data key and the unencrypted data key is discarded after encryption of the encrypted sensitive data;
   generating a new data object of a second format by:
      capturing the first path identifying the first data element of the data object and a second path of a second data element of the new data object via a dynamic proxy; and
      copying the encrypted sensitive data and the encrypted data key from the data object to the new data object in response to capturing the first and second path; and
   decrypting the encrypted sensitive data of the new data object using the encrypted data key.

2. The method of claim 1, further comprising:
   retrieving the encrypted data key from first encryption metadata of the new data object;
   receiving, based on the encrypted data key sent to an encryption service, a decrypted data key from the encryption service.

3. The method of claim 2, wherein the encrypted sensitive data is copied from second encryption metadata of the data object to the first encryption metadata of the new data object.

4. The method of claim 2, wherein the first encryption metadata comprises the second path identifying the second data element of the new data object, the encrypted sensitive data, and the encrypted data key.

5. The method of claim 4, wherein at least one of: the first path is different from the second path, or a path identifying the second data element of the data object is different from a new path identifying the corresponding data element in the new data object of the second format.

6. The method of claim 1, further comprising mapping the data object to the new data object to generate the dynamic proxy.

7. The method of claim 1, wherein at least one of the encrypted sensitive data or the unencrypted non-sensitive data indicates an approval or rejection for an automobile loan.

8. The method of claim 1, further comprising:
   identifying, based on a decryption identifier appended to the encrypted data key, a master key; and
   decrypting, based on the master key, the encrypted data key.

9. A system for decrypting data, the system comprising:
   a memory; and
   a processor coupled to the memory, the processor configured to perform operations comprising:
   receiving, a data object comprising encrypted sensitive data, unencrypted non-sensitive data, a first path identifying a first data element in a first format, and an encrypted data key, wherein the encrypted sensitive data of the data object is encrypted using an unencrypted data key and the unencrypted data key is discarded after encryption of the encrypted sensitive data;
   generating a new data object of a second format by:
      capturing the first path identifying the first data element of the data object and a second path of a second data element of the new data object via a dynamic proxy; and
      copying the encrypted sensitive data and the encrypted data key from the data object to the new data object in response to capturing the first and second path; and
   decrypting the encrypted sensitive data of the new data object using the encrypted data key.

10. The system of claim 9, the operations further comprising:
    retrieving the encrypted data key from first encryption metadata of the new data object;
    receiving, based on the encrypted data key sent to an encryption service, a decrypted data key from the encryption service.

11. The system of claim 10, wherein the encrypted sensitive data is copied from second encryption metadata of the data object to the first encryption metadata of the new data object.

12. The system of claim 10, wherein the first encryption metadata comprises the second path identifying the second data element of the new data object, the encrypted sensitive data, and the encrypted data key.

13. The system of claim 12, wherein at least one of: the first path is different from the second path, or a path identifying the second data element of the data object is different from a new path identifying the corresponding data element in the new data object of the second format.

14. The system of claim 9, the operations further comprising mapping the data object to the new data object to generate the dynamic proxy.

15. The system of claim 9, wherein at least one of the encrypted sensitive data or the unencrypted non-sensitive data indicates an approval or rejection for an automobile loan.

16. The system of claim 9, the operations further comprising:
    identifying, based on a decryption identifier appended to the encrypted data key, a master key; and
    decrypting, based on the master key, the encrypted data key.

17. A non-transitory computer-readable medium having instructions stored thereon that, when executed by at least one computing device, cause the at least one computing device to perform operations comprising:
    receiving, a data object comprising encrypted sensitive data, unencrypted non-sensitive data, a first path identifying a first data element in a first format, and an encrypted data key, wherein the encrypted sensitive data of the data object is encrypted using an unencrypted data key and the unencrypted data key is discarded after encryption of the encrypted sensitive data;

generating a new data object of a second format by:
    capturing the first path identifying the first data element of the data object and a second path of a second data element of the new data object via a dynamic proxy; and
    copying the encrypted sensitive data and the encrypted data key from the data object to the new data object in response to capturing the first and second path; and decrypting the encrypted sensitive data of the new data object using the encrypted data key.

18. The non-transitory computer-readable medium of claim 17, the operations further comprising:
    retrieving the encrypted data key from first encryption metadata of the new data object;
    receiving, based on the encrypted data key sent to an encryption service, a decrypted data key from the encryption service.

19. The non-transitory computer-readable medium of claim 18, wherein the encrypted sensitive data is copied from second encryption metadata of the data object to the first encryption metadata of the new data object.

20. The non-transitory computer-readable medium of claim 18, wherein the first encryption metadata comprises the second path identifying the second data element of the new data object, the encrypted sensitive data, and the encrypted data key.

\* \* \* \* \*